(12) United States Patent
Mayes et al.

(10) Patent No.: US 6,495,985 B1
(45) Date of Patent: Dec. 17, 2002

(54) OPERATION OF A SWITCHED RELUCTANCE MACHINE FROM DUAL SUPPLY VOLTAGES

(75) Inventors: Peter Richard Mayes; Paul Donald Webster, both of Harrogate (GB)

(73) Assignee: Switched Reluctance Drives, Ltd., Harrogate (GB)

( * ) Notice: Subject to any disclaimer, the term of this patent is extended or adjusted under 35 U.S.C. 154(b) by 0 days.

(21) Appl. No.: 09/533,769

(22) Filed: Mar. 23, 2000

(30) Foreign Application Priority Data

Mar. 23, 1999 (GB) ............................................. 9906716

(51) Int. Cl.[7] .................................................. H02P 1/46
(52) U.S. Cl. ........................ 318/701; 318/254; 318/439; 318/138
(58) Field of Search ................................ 318/701, 254, 318/439, 138; 363/132

(56) References Cited

U.S. PATENT DOCUMENTS

| | | | |
|---|---|---|---|
| 5,479,080 A | * 12/1995 | Jones et al. | .................. 318/701 |
| 5,489,810 A | 2/1996 | Ferreira et al. | |
| 5,493,195 A | 2/1996 | Heglund et al. | |
| 5,705,918 A | * 1/1998 | Davis | .......................... 318/701 |
| 5,864,477 A | * 1/1999 | Webster | ...................... 363/132 |

FOREIGN PATENT DOCUMENTS

EP        0573198 A        12/1993

OTHER PUBLICATIONS

Stephenson et al., "The Characteristics, Design and Application of Switched Reluctance Motors and Drives" PCIM '93, Nürnberg, Jun. 21–24, 1993.

* cited by examiner

*Primary Examiner*—Karen Masih
(74) *Attorney, Agent, or Firm*—Dicke, Billig & Czaja, P.A.

(57) ABSTRACT

A switched reluctance machine is supplied from two voltage sources during a cycle of excitation. The higher voltage is a conventional bus voltage obtained, e.g., from a low-voltage storage battery and an up-converter. The lower voltage is supplied directly from the battery. The higher voltage supplies the machine during only part of an excitation cycle, the lower voltage supply supplying the energy directly to the machine during the remainder of the excitation cycle. This reduces the duty of the up-converter and increases the efficiency of the overall drive. One method of operation of the circuit allows the elimination of the up-converter.

39 Claims, 7 Drawing Sheets

Fig 1

Prior Art

Fig 2

Prior Art

Fig 3

Prior Art

Fig 4(a)

Prior Art

Fig 4(b)

Prior Art

OPERATION OF A SWITCHED RELUCTANCE MACHINE FROM DUAL SUPPLY VOLTAGES

BACKGROUND OF THE INVENTION

1. Field of the Invention

The present invention relates to the operation of switched reluctance machines from dual voltages, particularly those performing starting and generating functions for internal combustion engines.

2. Description of Related Art

It is common for vehicles with internal combustion engines to be equipped with separate electrical machines: one for starting the engine and one for generating electrical power to recharge the starting battery and to supply ancillary electrical loads on the vehicle. The starter is typically supplied from a storage battery carried on board the vehicle. A 12 volt battery is commonly used for private cars and small industrial vehicles, whereas a 6 volt system has been used for motorcycles and a 24 volt system is commonly used on larger industrial vehicles. While in principle there is no particular limit to which storage batteries could be made, it has been found economic to limit the choices to these noted above.

If the vehicle is, say, a private car, the electrical loads presented by auxiliary equipment (e.g., windscreen wipers, ventilation fans, seat adjusters, heaters, etc) is relatively small and consequently the generator required to supply these loads and to keep the battery in a state of charge so that the engine can be restarted is also relatively small, typically around 60% of the size of the starter motor. Normally the generator generates onto an electrical bus running around the vehicle to supply the electrical loads and provide charge for the battery.

Although electrical machines in general can operate in both motoring and generating modes, it has not normally been found to be cost effective to combine the starting and the generating duties to allow them to be carried out by one machine. This is because of the speeds and loads over which the two machines typically operate; the starter has to provide peak power at relatively low engine speeds, say up to 600 rev/min, whereas the generator has to operate over a wide speed range, say 700 to 6000 rev/min and be capable of providing full output over most of that range. The result is that the two machines tend to be very different in design.

However, with the trend towards greater electrical loads, especially on larger vehicles, generator sizes are increasing, so the resulting generator weight is an incentive to seek ways of combining the starting and generating functions into a single machine. One type of electrical machine which is favored for this dual role is the switched reluctance machine, since it is economical to produce yet is inherently rugged and can operate over a wide speed range. U.S. Pat. Nos. 5,489,810 and 5,493,195 to Ferreira and Heglund, respectively, both incorporated herein by reference, describe certain aspects of switched reluctance machines used as starter/generators for aircraft engines.

In general, a reluctance machine is an electrical machine in which torque is produced by the tendency of its movable part to move into a position where the reluctance of a magnetic circuit is minimized, i.e. where the inductance of the exciting winding is maximized. In one type of reluctance machine, the energization of the phase windings occurs at a controlled frequency. This type is generally referred to as a synchronous reluctance machine, and it may be operated as a motor or a generator. In a second type of reluctance machine, circuitry is provided for detecting the angular position of the rotor and energizing the phase windings as a function of the rotor position. This second type of reluctance machine is generally known as a switched reluctance machine and it may also be a motor or a generator. The characteristics of such switched reluctance machines are well known and are described in, for example, "The characteristics, design and application of switched reluctance motors and drives" by Stephenson and Blake, PCIM '93, Nürnberg, Jun. 21–24, 1993, incorporated herein by reference. The present invention is generally applicable to reluctance machines, particularly switched reluctance machines operating as both motors and generators.

Figure 1:
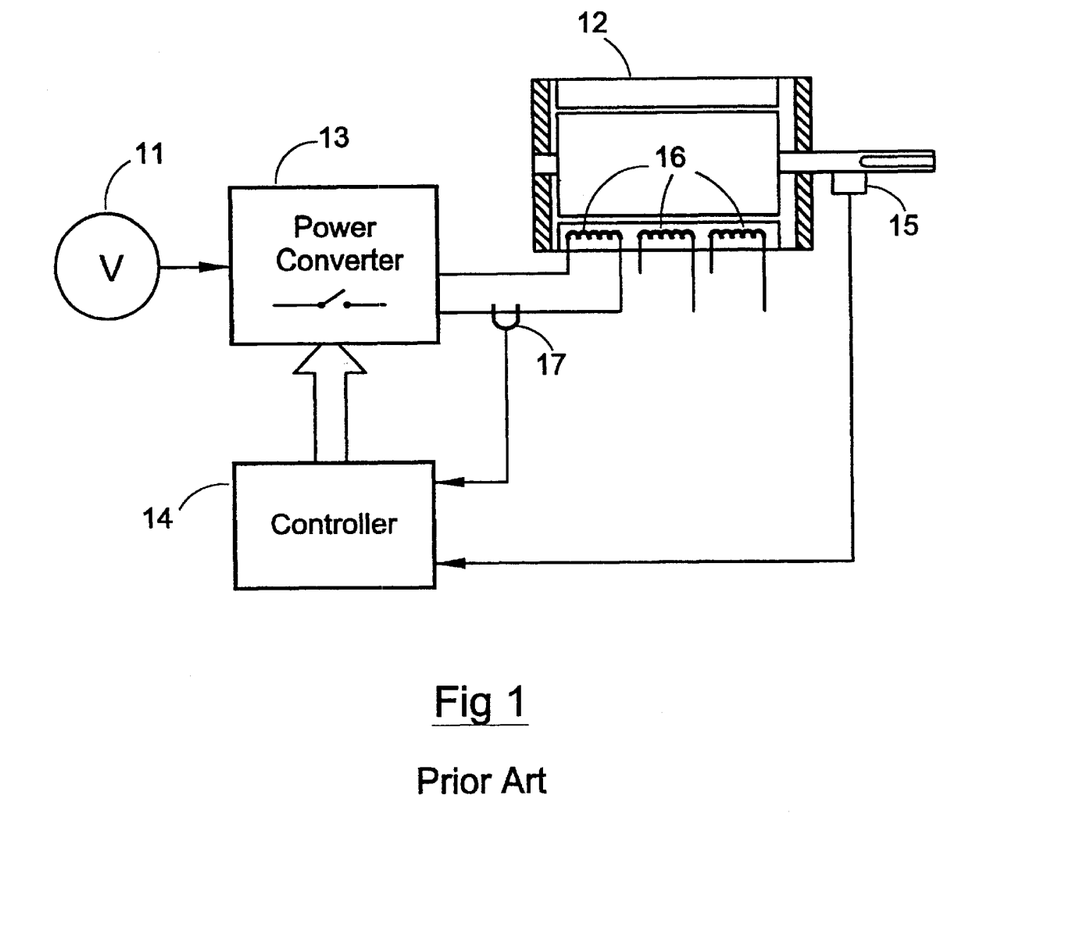
FIG. 1 shows the principal components of a switched reluctance drive system.

FIG. 1 shows the principal components of a typical switched reluctance drive system. The input DC power supply 11 can be a battery or rectified and filtered AC mains for example. The DC voltage provided by the power supply 11 is switched across the phase windings 16 of the machine 12 by a power converter 13 under the control of the electronic control unit 14. Some form of current detection 17 is typically used to provide current feedback from the phase windings to the controller. The switching must be correctly synchronized to the rotation of the rotor for proper operation of the drive. A rotor position detector 15 is typically employed to supply signals corresponding to the angular position of the rotor. The output of the rotor position detector 15 may also be used to generate a speed feedback signal.

The rotor position detector 15 may take many forms, for example it may take the form of hardware, as shown schematically in FIG. 1, or of a software algorithm which calculates the position from other monitored parameters of the drive system, as described in EP-A-0573198 (Ray), incorporated herein by reference. In some systems, the rotor position detector 15 can comprise a rotor position transducer that provides output signals that change state each time the rotor rotates to a position where a different switching arrangement of the devices in the power converter 13 is required.

The energization of the phase windings in a switched reluctance machine depends heavily on accurate detection of the angular position of the rotor. The importance of accurate signals from the rotor position detector 15 may be explained by reference to FIGS. 2 and 3, which illustrate the switching of a reluctance machine operating as a motor.

Figure 2:
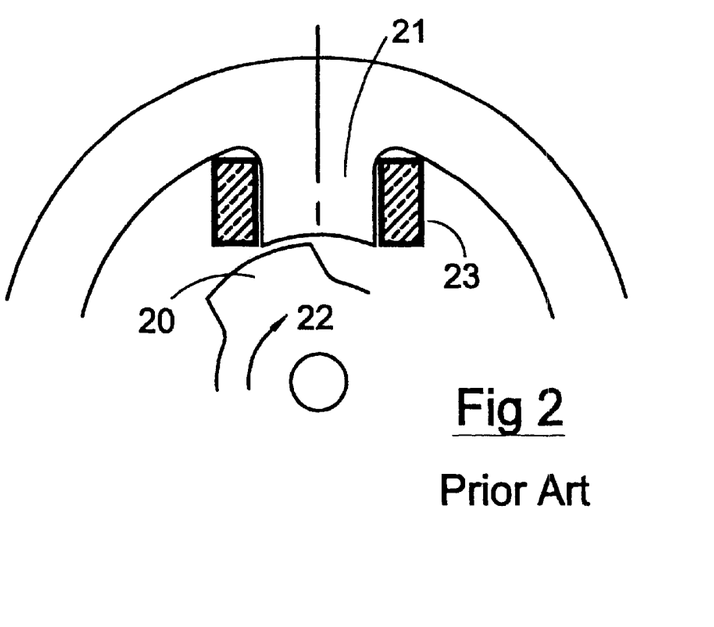
FIG. 2 shows a schematic diagram of a rotor pole approaching a stator pole.

FIG. 2 generally shows a rotor pole 20 approaching a stator pole 21 according to arrow 22. As illustrated in FIG. 2, a portion 23 of a complete phase winding 16 is wound around the stator pole 21. As discussed above, when the portion of the phase winding 16 around stator pole 21 is energized, a force will be exerted on the rotor, tending to pull rotor pole 20 into alignment with stator pole 21.

Figure 3:
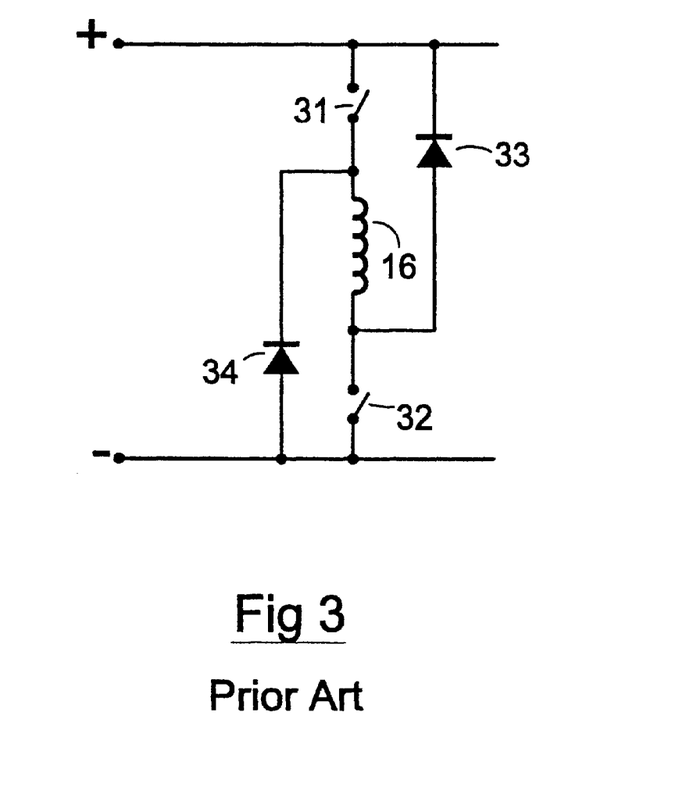
FIG. 3 shows typical switching circuitry in a power converter that controls the energization of the phase windings of the machine of FIG. 1.

FIG. 3 generally shows typical switching circuitry in the power converter 13 that controls the energization of the phase winding 16, including the portion 23 around stator pole 21. When switches 31 and 32 are closed, the phase winding is coupled to the source of DC power and is energized. Many other configurations of switching circuitry are known in the art: some of these are discussed in the Stephenson & Blake paper cited above.

Figure 4A:
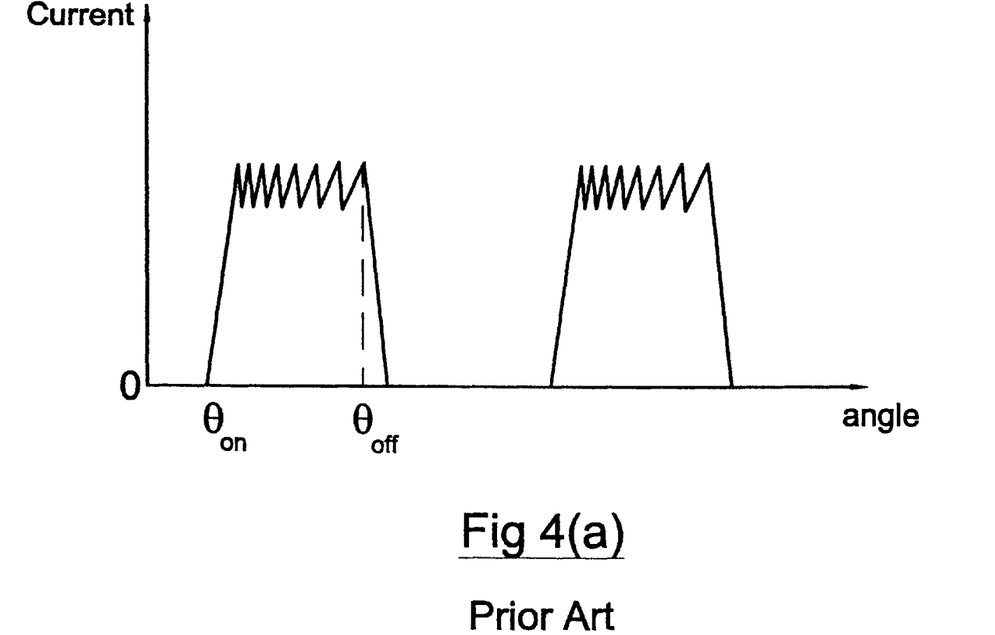
FIGS. 4(a) and 4(b) illustrate typical current waveforms of a switched reluctance drive operating in chopping and single-pulse modes respectively.

In general, the phase winding is energized to effect the rotation of the rotor as follows. At a first angular position of the rotor (called the "turn-on angle", $\theta_{ON}$), the controller 14 provides switching signals to turn on both switching devices 31 and 32. When the switching devices 31 and 32 are on, the phase winding is coupled to the DC bus, causing an increasing magnetic flux to be established in the machine. The magnetic flux produces a magnetic field in the air gap which acts on the rotor poles to produce the motoring torque. The magnetic flux in the machine is supported by the magnetomotive force (mmf) which is provided by a current flowing from the DC supply through the switches 31 and 32 and the phase winding 23. In some controllers, current feedback is employed and the magnitude of the phase current is controlled by chopping the current by rapidly switching one or both of switching devices 31 and/or 32 on and off. FIG. 4(a) shows a typical current waveform in the chopping mode of operation, where the current is chopped between two fixed levels. In motoring operation, the turn-on angle $\theta_{ON}$ is often chosen to be the rotor position where the centerline of an inter-polar space on the rotor is aligned with the centerline of a stator pole, but may be some other angle.

In many systems, the phase winding remains connected to the DC bus (or connected intermittently if chopping is employed) until the rotor rotates such that it reaches what is referred to as the "freewheeling angle", $\theta_{FW}$. When the rotor reaches an angular position corresponding to the freewheeling angle (e.g., the position shown in FIG. 2) one of the switches, for example 31, is turned off. Consequently, the current flowing through the phase winding will continue to flow, but will now flow through only one of the switches (in this example 32) and through only one of the diodes 33/34 (in this example 34). During the freewheeling period, the voltage drop across the phase winding is small, and the flux remains substantially constant. The circuit remains in this freewheeling condition until the rotor rotates to an angular position known as the "turn-off angle", $\theta_{OFF}$, (e.g. when the centerline of the rotor pole is aligned with that of the stator pole). When the rotor reaches the turn-off angle, both switches 31 and 32 are turned off and the current in phase winding 23 begins to flow through diodes 33 and 34. The diodes 33 and 34 then apply the DC voltage from the DC bus in the opposite sense, causing the magnetic flux in the machine (and therefore the phase current) to decrease.

Figure 4B:
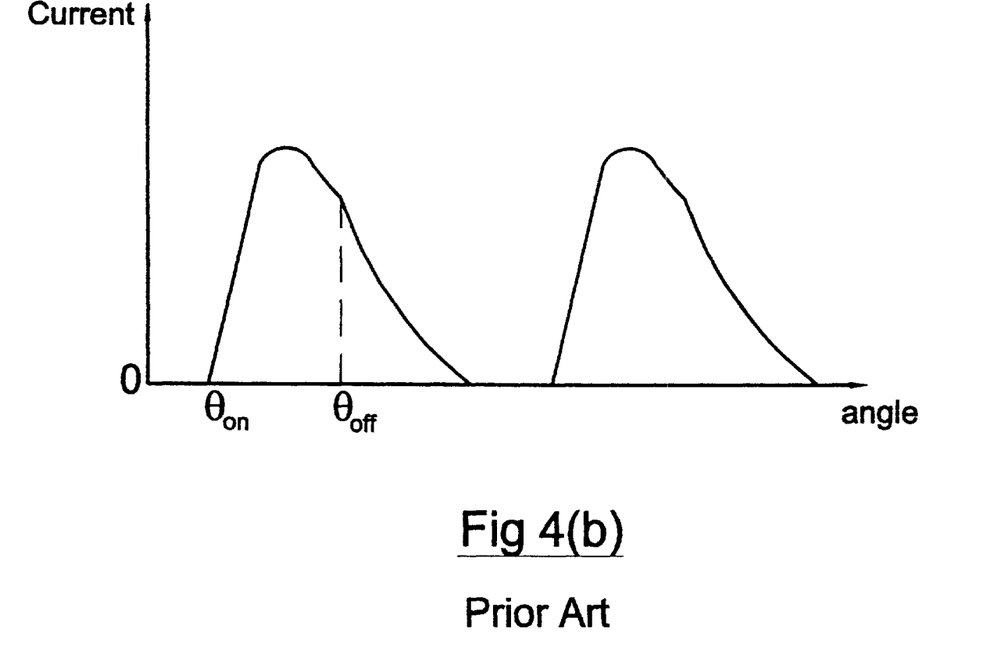

As the speed of the machine rises, there is less time for the current to rise to the chopping level, and the drive is normally run in a "single-pulse" mode of operation. In this mode, the turn-on, freewheel and turn-off angles are chosen as a function of, for example, speed and load torque. Some systems do not use an angular period of freewheeling, i.e. switches 31 and 32 are switched on and off simultaneously. FIG. 4(b) shows a typical such single-pulse current waveform where the freewheel angle is zero. It is well known that the values of turn-on, freewheel and turn-off angles can be predetermined and stored in some suitable format for retrieval by the control system as required, or can be calculated or deduced in real time.

Figure 5:
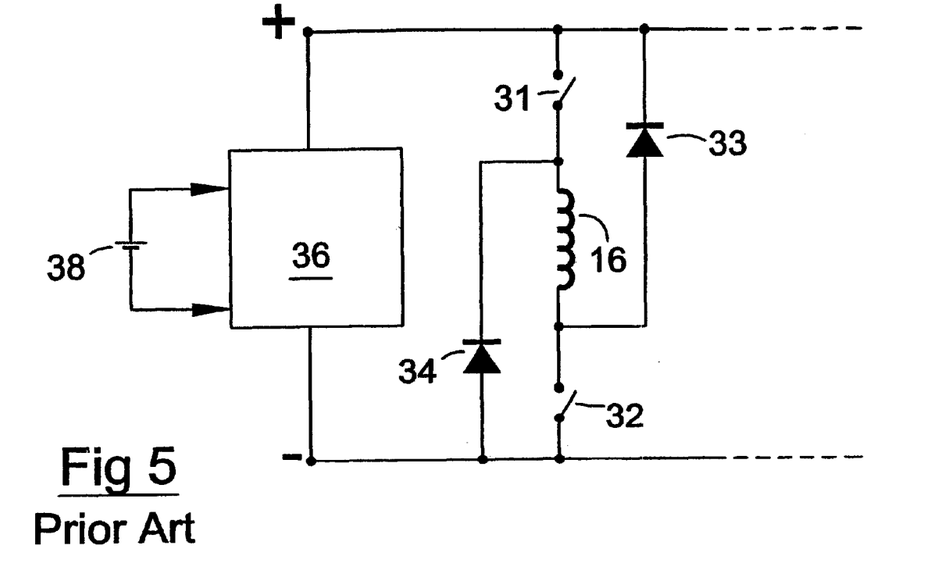
FIG. 5 shows an up-converter supplying the DC bus of FIG. 3 from a low-voltage battery.

One development in electrical systems for vehicles, particularly those where the electrical load is high, is to use a high-voltage bus to supply these loads. Known designs for such vehicles use bus voltages between 24 and 600 volts. The use of these higher voltages provides a more efficient system since, for a given power, the currents are reduced as the bus voltage is raised. However this immediately brings a problem if the starting and generating functions are to be performed by one machine, since the storage battery used for starting the vehicle is unlikely to be higher than 24 volts. A machine designed to operate at a high voltage will not produce the necessary power as a starter motor if operated in the conventional manner from a low-voltage battery. One known solution is to interpose an up-converter between the battery and the machine to convert the battery voltage to a voltage at least near to the high bus voltage of the vehicle. This allows the electrical machine to operate at the same voltage for both starting and generating duties, thus avoiding the difficulty of designing the machine to operate on two quite different voltages, albeit at the expense of providing the up-converter. Such an arrangement for a switched reluctance machine is shown in FIG. 5, where only one phase of the machine is shown for convenience. The battery 38 supplies an up-converter 36 of known type to provide a high-voltage DC bus from which the winding(s) of the machine are excited in the conventional manner. The efficiency of the up-converter is a function of the voltage ratio it has to achieve. For example, an up-converter raising the voltage from 24 to 300V and having an output rating of around 10 kW will be of the order of 80% efficient. The losses are supplied from the storage battery and may therefore reduce the amount of energy available to start the engine. In addition, the cost of the up-converter is proportional to its power rating and this cost may be very significant. The conventional solution, therefore, has disadvantages of inefficiency and cost.

SUMMARY OF THE INVENTION

It is an object of the present invention at least to alleviate some of the problems associated with the prior art by supplying a switched reluctance machine from dual voltages.

According to one aspect of the invention there is provided a method of energizing a phase winding of a switched reluctance machine during a conduction period, including: supplying energy to the winding at a first voltage, and supplying energy to the winding subsequently within the same conduction period at a second voltage.

A circuit is provided by which the machine can operate from two voltages during a conduction period, hence providing the opportunity to reduce the duty and rating of the up-converter by using a lower voltage in the conduction period when appropriate. One embodiment of the invention eliminates the need for an up-converter. Thus, by the appropriate use of a lower voltage in the conduction period the up-converter can be a lower rated unit, if not eliminated altogether. This is a cost-effective solution to running a switched reluctance machine from a lower supply voltage in association with a relatively heavy load.

BRIEF DESCRIPTION OF THE DRAWINGS

The invention can be put into practice in various ways, some of which will now be described by way of example with reference to the accompanying drawings, in which.

DETAILED DESCRIPTION OF PREFERRED EMBODIMENTS

Figure 6:
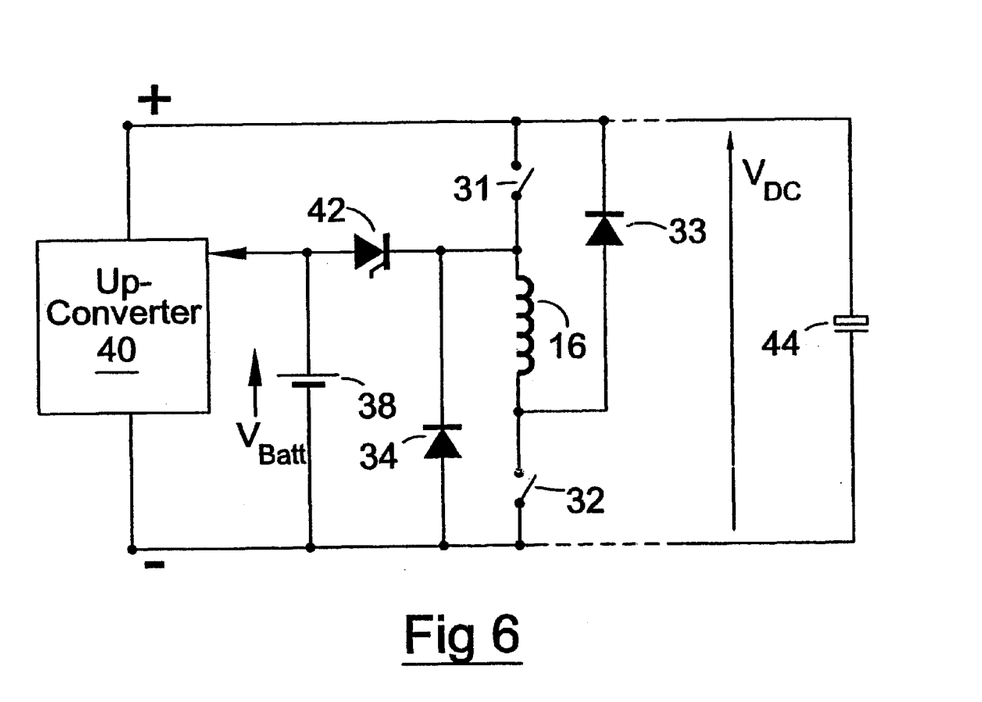
FIG. 6 shows a converter circuit according to an embodiment of the invention.

Embodiments of the invention use two different voltages to supply the windings of a switched reluctance machine during their excitation cycles. Consider a situation in which the reluctance machine is fitted as a starter motor/generator in an automobile. As a generator, it will typically be rated for continuous duty at a predetermined power output and high vehicle bus voltage. For the starting function, the machine requires the higher bus voltage to drive it, but the available battery voltage will typically be lower. Whereas the prior art converter circuit required a heavy duty up-converter to provide the high voltage to drive the machine throughout the starting period, the circuit according to embodiments of the invention drives the motor using only the battery voltage, when appropriate. A smaller up-converter can then be used if it is needed at all. This can be achieved by a variety of circuits, a preferred form of which is shown in FIG. 6 for one phase of a polyphase machine. Each other phase is also connected across the battery and between the supply voltage rail providing $V_{DC}$. Those circuit elements common to FIGS. 1 and 6 have been given like reference numerals.

The switching circuit for the switched reluctance machine is of the two-switch-per-phase type, though other switch configurations are known which could be used. The circuit has a DC link which, in this embodiment, has a DC link capacitor 44 from which the machine windings are fed by the upper and lower switches 31, 32. The phrases 'upper switch' and 'lower switch' are used here for illustrative convenience and not to indicate any necessary positional significance.

A DC to DC up-converter 40 here acts as an up-converter to supply the DC link. The cathode of a thyristor 42 is connected to the junction of the winding 16, the cathode of the diode 34 and the upper switch 31. A low-voltage battery 38 is connected between the negative voltage rail and the junction between the anode of thyristor 42 and the power input to the converter 40. In, for example, an automobile, the low-voltage battery is the main electrical storage device for the auxiliary electrical devices. The switched reluctance machine 12 is the starter motor for the internal combustion engine. As the machine is designed to generate onto a higher voltage bus (as described above) then it also requires that higher voltage to provide the necessary torque to turn the engine.

One method of operation is as follows. The up-converter 40 is controlled to supply energy to the DC link from the battery 38 in the conventional way. At the start of the conduction period for the phase winding 16 (which starting point is determined in the conventional way), the switches 31 and 32 are closed, applying the high DC bus voltage to the phase winding. The flux, and hence the current, rises until some further action is taken by the control circuit. Thus, the battery supplies the required energy initially through the up-converter 40 at a high voltage.

Figure 7:
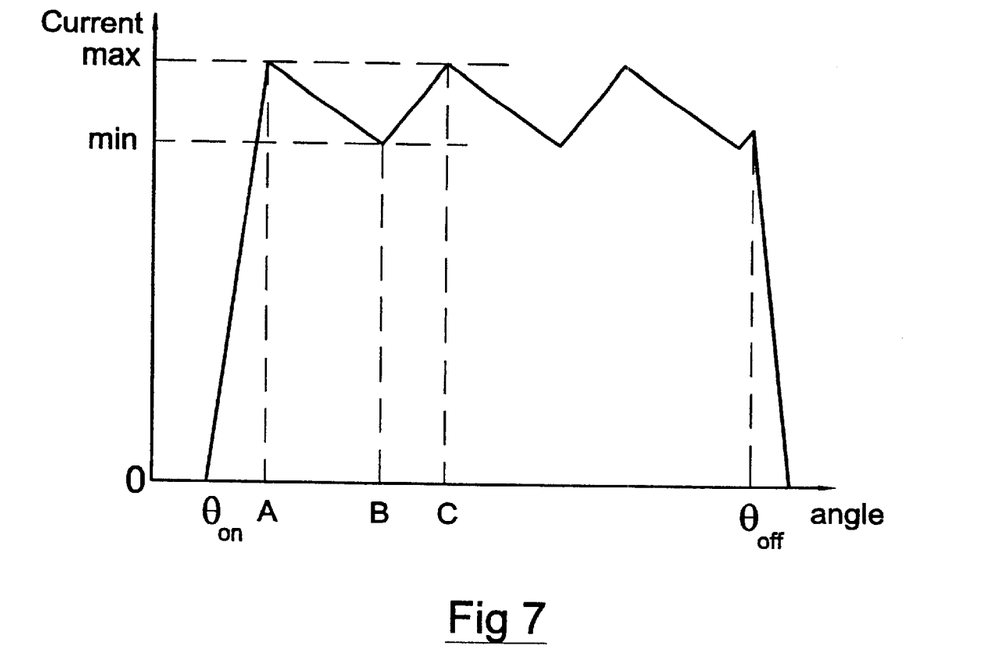
FIG. 7 shows a phase winding current waveform produced by one method of operating the invention.

FIG. 7 shows the current waveform which would result if a bang-bang hysteresis-type current controller were used. Those familiar with the technology will realize that many different types of current controller could be used. A hysteresis type is convenient for the purposes of illustration. It will also be understood that parts of the waveform diagrams have been exaggerated for clarity. When the current reaches the upper bound at point A under the influence of the high voltage from the converter, the upper switch 31 is turned off and the current freewheels around the loop of the phase winding 16, the lower switch 32 and the lower diode 34. Alternatively, the lower switch 32 could be opened and the current would freewheel around the phase winding 16 the upper switch 31 and the upper diode 33. Regardless of which switch is opened, the current falls relatively slowly (as the flux decays under the influence of the voltage drops across the winding and devices) until it reaches the lower bound at point B.

During the transition from point A to point B, the current (and therefore the flux) lies in an acceptable range. It has been recognized that the fall high voltage is not absolutely necessary to control the current within that range once the range is reached during a conduction period. Thus, the switches are now actuated, if necessary, to ensure that it is the upper switch that is open and the lower switch that is closed. The thyristor 42 is then fired and only the battery voltage is applied directly to the phase winding 16, avoiding use of the converter and its inefficiencies. The size of this battery voltage is significant relative to the combined voltage drop across the phase winding and devices: if the battery voltage is greater than the voltage drop, the flux and current will rise, albeit much more slowly than it did when supplied from the DC link; if the battery voltage is less than the voltage drop, the flux and current will fall, albeit more slowly than it did when freewheeling. FIG. 7 is drawn on the basis that the current will rise. Assuming the current rises, then it will eventually reach the upper hysteresis limit at point C, where there is a choice of operation.

In the first method the upper switch 31 may now be closed again, to turn off (commutate) thyristor 42, and the lower switch 32 opened, allowing the current to freewheel around switch 31, winding 16 and diode 33. A second method is briefly to close upper switch 31, to commutate thyristor 42, and then to open it again, allowing the current to freewheel around switch 32, winding 16 and diode 34. The phase current waveform produced by either of these methods is shown in FIG. 7 in which a single phase conduction period is defined as the angle between switch on at $\theta_{on}$ and switch off at $\theta_{off}$ of the upper and lower switches 31, 32.

The two methods could be used alternately to share the freewheeling duty between the two switches and balance out their thermal duty. However with both of these methods the thyristor is suddenly reverse biased and will suffer a high rate of change of current with respect to time (di/dt), requiring a high-grade device, possibly with the addition of snubbing components. In addition, the battery current is discontinuous, leading to relatively high peak currents in the battery for a given power.

A third method of operation at point C is simply to open switch 32, so that current continues to flow from the battery through the winding, but now routed through the diode 33 to the DC link capacitor 44. This transfers energy to the DC link capacitor, replicating the action of the up-converter 40. The flux, and hence the current, decays against $(V_{DC}-V_{Batt})$. If the battery voltage $V_{Batt}$ is small compared with the link voltage $V_{DC}$, the rate of decay will be similar to that produced by $V_{DC}$ alone. The advantages of this method are that the thyristor does not require to be commutated and hence current is drawn continuously from the battery. However the duty on the lower switch is increased since it is not possible to equalize the duty of the two switches 31 and 32 as the switch 31 is always off and 32 alone is used. This method produces a current waveform which is similar to FIG. 7 except that the portion following point C falls more steeply.

A fourth method is to commutate thyristor 42 as before by closing switch 31 and then to open both switches, so that the energy stored in the winding is transferred to the DC link capacitor (as is the case when the two-switch-per-phase circuit is operated conventionally). This method, however, re-introduces the disadvantage of discontinuous battery current.

It may be found beneficial to use a combination of two or more of these options in a sequence, since the energy transfer options, i.e. the third and fourth methods, will maintain the DC link capacitor charged and further reduce the duty on the up-converter, and the other two options, i.e. the first and second methods, used in turn will share the freewheeling duty between the two switches, which is thermally beneficial. Those skilled in the art will realize that it would be a routine matter to arrange the control scheme to, for example, use an energy transfer mode till the capacitor reaches a certain threshold voltage then use freewheeling until the capacitor voltage falls again.

The chopping routine described above continues until such time as the rotor moves to the switch-off angle $\theta_{off}$ and torque production is no longer desired from that phase. Either the third or fourth method described above can be used at this point to de-energize the phase winding. If method three is used, the thyristor naturally commutates off when the current reaches zero. When operated in this manner, the thyristor is on from point B till current extinction and it can be a relatively "slow" device (i.e. of 'converter' grade). With either method, energy transfer to the DC link at the end of the conduction period further reduces the duty on the up-converter.

Figure 8:
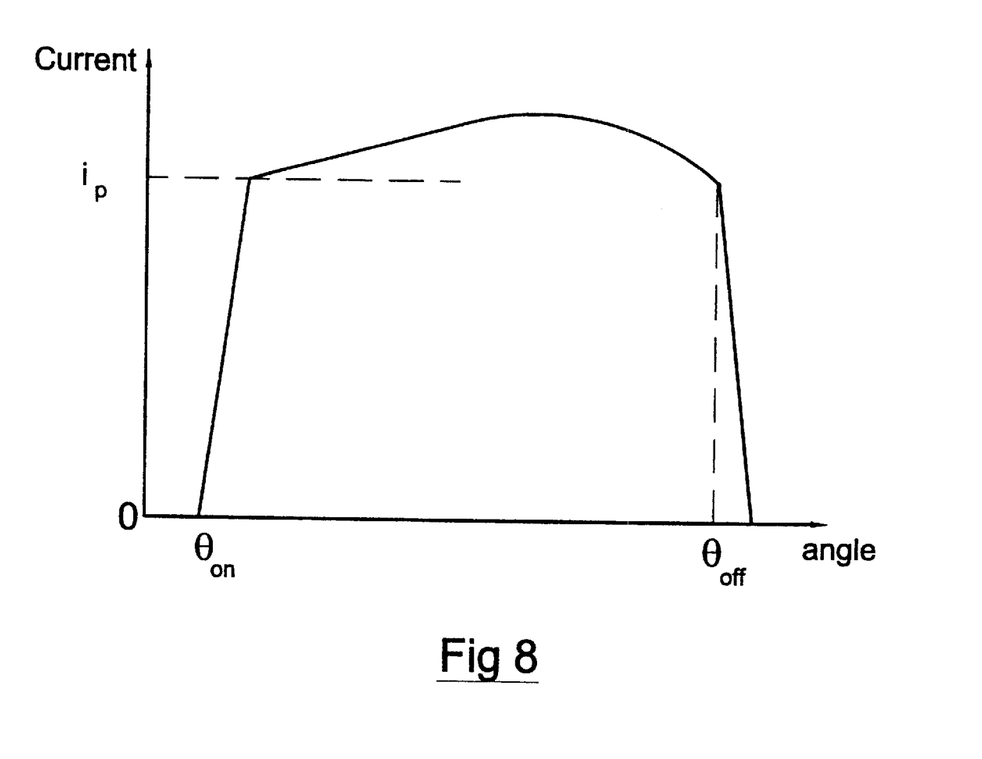
FIG. 8 shows a phase winding current waveform produced by a second method of operating the invention.

A fifth method of operating the circuit is beneficial in those situations where the battery voltage is a little larger than the combined voltage drop across the thyristor 42, the winding 16 and the lower switch 32. In this situation, the flux increases only slowly and the current may increase slowly, or may be forced down under the action of the back emf of the winding. This is described with reference to FIG. 8. The winding is connected to the high voltage supply at $\theta_{on}$ as before by closing upper and lower switches. When the current reaches a predetermined level, $i_p$, the upper switch is opened and the battery voltage applied by firing thyristor 42. As shown, the current rises slowly at first, but is forced down eventually by the back emf. It is switched off, preferably by using the third method as described above, at $\theta_{off}$. It will be apparent to the skilled person that a variety of current waveforms could be obtained by varying the level at which the supply is changed from the high to the low voltage and the $\theta_{off}$ point. The advantage with all of these waveforms, however, is that the switching activity is greatly reduced, giving rise to lower switching loss and less acoustic noise. As before, the rating of the up-converter is reduced, enabling a reduction in size and cost.

Figure 9:
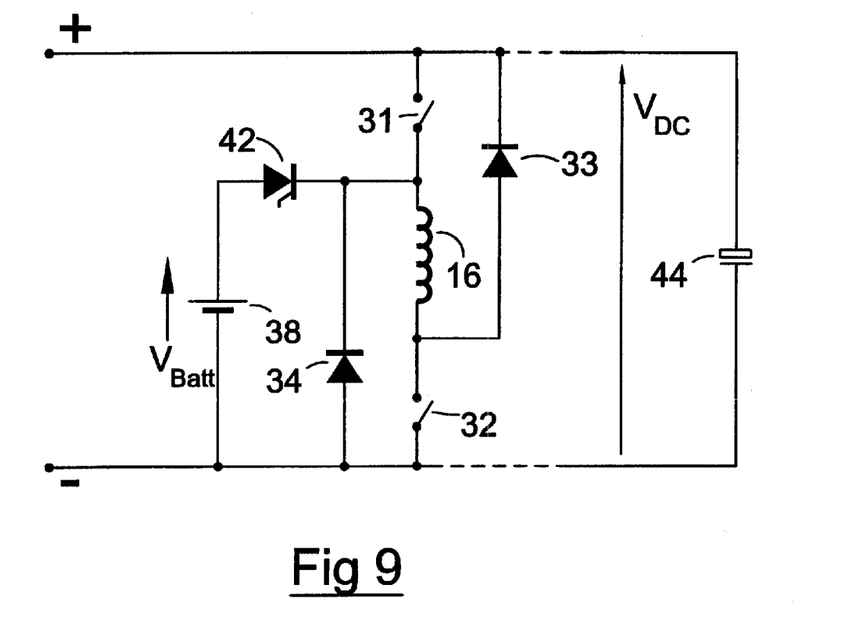
FIG. 9 shows an alternative circuit which eliminates the up-converter.

The descriptions above have been based on the assumption that an up-converter is required to prime and maintain the DC link. However, if the amount of power required for initial energization is small, or if a small time delay before energizing the motor is acceptable, then the up-converter may be eliminated. This embodiment is illustrated in FIG. 9 in which the equivalent components to those in FIG. 6 are given like reference numerals.

The initial energization can be achieved by two methods. Firstly, the battery voltage alone can be used to drive up the winding current by firing thyristor 42 and switch 32. If the battery is of sufficient capacity, the excitation of the winding will eventually reach a sufficient level. Thereafter, switching of the winding using the third or fourth method above will serve to prime and maintain the DC link. This will be adequate provided the circuit resistance is sufficiently low, which will typically be the case for large machines. Secondly, the DC link 44 can be primed by firing the thyristor 42 and repeatedly opening and closing switch 32, thus using the winding 16 as the inductor part of a voltage booster topology known in itself to the skilled person. Once the DC link has reached a suitable voltage, operation can proceed as described above for any of the five methods.

It will be appreciated that, although the machine can be operated initially without a high voltage link present, the high voltage link is generally required as the machine speed rises, since the lower battery voltage would not be able to raise the current to the required level in the shortened cycle time available. Hence, it is preferable to have a mechanism to prime and maintain the DC link in the absence of an up-converter.

It should be noted that the phase winding used for priming and/or maintaining the DC link by voltage boosting need not be a phase winding which is in a torque-productive position, since a phase at the maximum or minimum inductance position could be used. Generally, use of the minimum inductance region is preferred since it extends over a wider rotor angle, yields more current per unit flux and does not produce any unwanted torque disturbances on the machine.

Further, it will be realized by the skilled person that two or more or all of the phases may be used simultaneously to prime or maintain the DC link.

If an up-converter is retained, the reduced duty facilitated by the invention described above may allow the up-converter to be reduced to approximately the same rating as a down-converter typically used to re-charge the battery from the DC link. In this case, it is possible to replace the up-converter with a DC to DC converter which is bi-directional, acting as an up-converter from the battery when the machine is operating as a starter and acting as a down-converter to re-charge the battery when the machine is acting as a generator.

Figure 10:
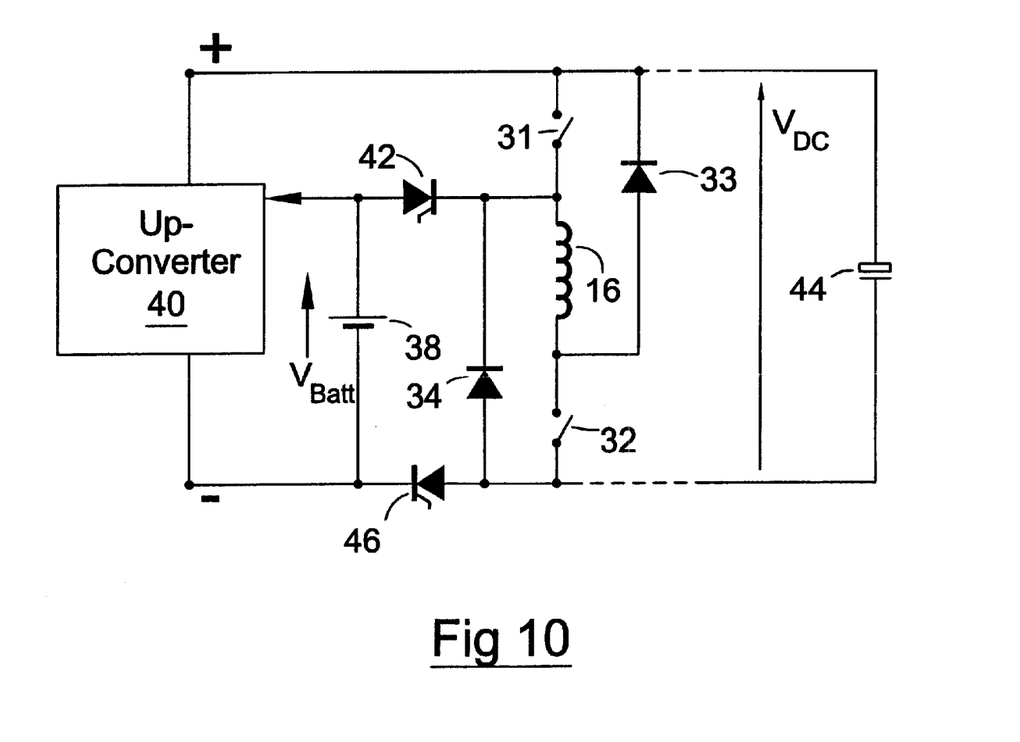
FIG. 10 shows an alternative circuit providing battery isolation.

FIG. 10 shows a further embodiment of the invention where a second thyristor 46 is introduced into the bottom line of the DC bus to conduct from the DC link capacitor 44 to the battery 38, thus enabling the battery to be isolated from the high voltage supply. In practice, the second thyristor is simply fired simultaneously with the first. The second thyristor could equally well be a mechanical switch, e.g. a solenoid-operated switch as employed by conventional starter motors.

FIGS. 6, 9 and 10 show thyristors as the device used to connect the battery to the phase winding. It will be understood by the skilled person that other types of switch could be used, e.g., MOSFETs, gate turn-off thyristors, (GTOs); etc., though each would require the appropriate gating or driving circuits to be provided. The thyristor is particularly suited because it self commutates at the end of the phase period, except in the fourth method. It has a relatively low on-state voltage drop and can tolerate high peak currents. It is generally regarded as being the cheapest form of semiconductor switch.

Figure 11:
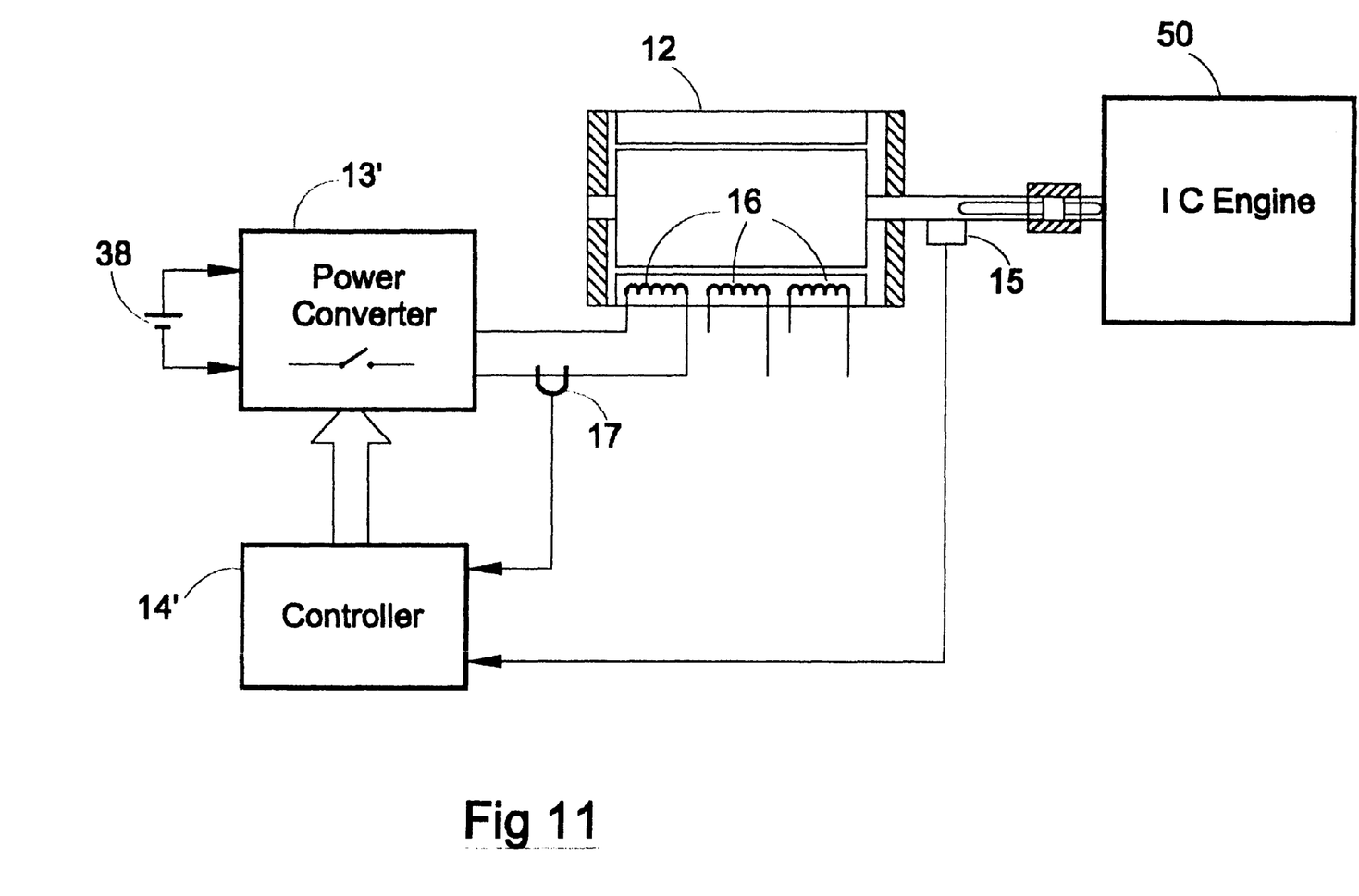
FIG. 11 shows the circuit of an embodiment of the invention used as a starter motor/generator for an internal combustion engine.

It was stated above that embodiments of the invention can be used in conjunction with a number of different control regimes to equal effect. Embodiments of the invention allow for two different voltages to be connected across the or each phase winding at different times during a conduction period in a switched reluctance machine. In this way the circuit of the invention can be used as part of a combined starter motor/generator for an internal combustion engine. Such a system is illustrated in FIG. 11. The internal combustion engine 50 can be used in an automobile, a motor cycle or as part of fixed plant, such as a compressor set. The battery 38 is the engine battery. The switched reluctance motor 12 is engaged to rotate, and be rotated by, the engine 50 to effect the starter and generator modes. The mechanical connection between the drive shaft and the engine is shown schematically in FIG. 11.

Thus, while the illustrative embodiments given above have been explained in terms of motoring operation, it will be appreciated that the excitation sequences could apply equally to generating operation. Further, it will be recognized that the invention can be used with any type of switched reluctance machine. It can be used in a switched reluctance system with any number of phases, including one. Nor is the invention limited to the two-switch per phase converter circuit used for illustration, as many of the prior art converter circuits can be used. Some other known switching topologies are referred to in the PCIM '93 paper incorporated by reference above. Others are equally well known to the skilled person. Equally, the references in the above to a battery do not preclude the use of other energy storage devices, such as ultra capacitors or the use of a source of electrical power that is not an energy storage device. For example, the rectified output of a transformer (or other AC source) could be used instead. The monitoring of current could be replaced by monitoring of another machine parameter such as voltage across the winding. Accordingly, the above description of embodiments is made by way of example and not for the purposes of limitation. The present invention is intended to be limited only by the spirit and scope of the following claims.

What is claimed is:

1. A converter circuit for a switched reluctance motor, the motor having at least one energizable phase winding, the circuit comprising:
   a first source of electrical energy for supplying energy to the at least one phase winding at a first voltage;
   first means for connecting the first source to the at least one phase winding;
   a second source of electrical energy for supplying energy at a second voltage; and
   second means for connecting the second source to the at least one phase winding;
   wherein the first source of electrical energy is connectable in parallel with the at least one phase winding; further wherein the second source of electrical energy is connectable in parallel with the at least one phase winding.

2. A circuit as claimed in claim 1 in which the second source has positive and negative terminals and the second means for connecting comprises a thyristor operable to conduct from the positive terminal of the source of electrical energy to the at least one phase winding.

3. A circuit as claimed in claim 2 in which the second means for connecting comprises a switch operable to conduct from the at least one phase winding to the negative terminal of the source of electrical energy.

4. A circuit as claimed in claim 3 in which the switch is a thyristor.

5. A circuit as claimed in claim 1 in which the second source of electrical energy comprises an electrical storage device.

6. A circuit as claimed in claim 1 in which the first source includes a capacitor for maintaining its voltage.

7. A circuit as claimed in claim 1 including a converter having an input arranged to receive the second voltage and an output connected to the first source, the converter being operable to convert from the second voltage to the first voltage.

8. A circuit as claimed in claim 1 in which the second voltage is lower than the first voltage.

9. The converter circuit of claim 1, wherein the second source has positive and negative terminals and the second means for connecting comprises a switch operable to conduct from the positive terminal of the second source to the at least one phase winding.

10. A switched reluctance drive comprising a reluctance motor having a stator, at least one energizable phase winding, and a converter circuit for the reluctance motor, the circuit comprising:
    first source of electrical energy for supplying energy to the at least one phase winding at a first voltage;
    first means for connecting the first source to the at least one phase winding;
    a second source of electrical energy for supplying energy at a second voltage; and
    second means for connecting the second source to the at least one phase winding.

11. A switched reluctance drive as claimed in claim 10 in which the first means for connecting includes a two-switches-per-phase switch circuit.

12. A switched reluctance drive as claimed in claim 10, further comprising a bi-directional DC-to-DC converter, providing an up conversion of the second voltage to the first voltage at its output and down conversion of the first voltage to the second voltage at its input.

13. A switched reluctance drive as claimed in claim 12, further comprising means for connecting the drive to an internal combustion engine for use of the drive as a starter/generator for the engine.

14. A method of operating a switched reluctance drive comprising a reluctance motor having a stator, at least one energizable phase winding, and a converter circuit for the reluctance motor, tie circuit comprising: a first source of electrical energy for supplying energy to the at least one phase winding at a first voltage; first means for connecting the first source to the at least one phase winding; a second source of electrical energy for supplying energy at a second voltage; and second means for connecting the second source to the at least one phase winding; the method operating the drive to apply two voltages successively across the at least one phase winding during a conduction period, the method comprising:
    actuating the first means for connecting to apply the first voltage across the at least one phase winding;
    monitoring a parameter of the motor to control the output of the motor; and
    actuating the second means for connecting to apply the second voltage to the at least one phase winding when the monitored parameter reaches a predetermined value so that the voltage across the at least one phase winding is reduced relative to the first value.

15. A method as claimed in claim 14 in which the monitored parameter of the motor is a winding current.

16. A method as claimed in claim 14 in which the output of the motor is controlled according to hysteresis control, the second voltage being applied to the at least one phase winding when the monitored parameter reaches a predetermined value to maintain the current within a predetermined band during the conduction period.

17. A method as claimed in claim 14 in which the first means for connecting includes a two-switches-per-phase switch circuit, further in which the two-switches-per-phase switch circuit comprises an upper switch connected between the first source and one end of the at least one phase winding, a lower switch connected between the first source and The other end of the at least one phase winding; and recirculating diodes which are respectively connected in parallel with each of the upper and lower switches and the at least one phase winding, the second means for connecting including a switch connected between the second source and the one end of the at least one phase winding, the method comprising deactuating one of the upper and lower switches for the current to decay in the at least one phase winding when the parameter of the motor reaches an upper value.

18. A method as claimed in claim 14 in which the first means for connecting includes a two-switches-per-phase switch circuit, further in which the two-switches-per-phase switch circuit comprises an upper switch connected between the first source and one end of the at least one phase winding, a lower switch connected between the first source and the other end of the at least one phase winding; and recirculating diodes which are respectively connected in parallel with each of the upper and lower switches and the at least one phase winding, the second means for connecting including a switch connected between the second source and the one end of the at least one phase winding, the method comprising: deactuating both of the upper and lower switches for the current to decay in the at least one phase winding when the parameter of the motor reaches an upper value.

19. A method as claimed in claim 17 in which the upper and lower switches are deactuated alternately for each decaying interval within the conduction period or deactuated alternately for successive conduction periods.

20. A method as claimed in claim 17 in which the second means for connecting is actuated to apply the second voltage to the at least one phase winding when the parameter reaches a lower level within the conduction period.

21. A method as claimed in claim 17 in which the current is decayed by opening the lower switch so that the second source of energy is transferred to the first source through the upper switch.

22. A method as claimed in claim 17 in which the current is decayed by closing the upper switch and then opening both the upper and lower switches so that the energy stored in the at least one phase winding is transferred to the first source through the recirculating diodes.

23. A method as claimed in claim 21, wherein during the conduction period the first voltage of the first source is maintained.

24. A method as claimed in claim 17 in which the second means for connecting is actuated to connect the second voltage across the at least one phase winding at the beginning of the conduction period.

25. A method as claimed in claim 17 in which the voltage of the first source is raised by actuating the second means for connecting and actuating the lower switch repeatedly.

26. A method as claimed in claim 25 in which the voltage of the first source is raised outside the conduction period of that phase.

27. A method of energizing a phase winding of a switched reluctance motor during a conduction period, including:
    supplying energy to the winding at a first voltage from a first source connectable in parallel with the winding; and
    supplying energy to the winding subsequently within the same conduction period at a second voltage from a second source connectable in parallel with the winding.

28. The method of claim 27, wherein the second voltage is supplied by a source of electrical energy having positive and negative terminals; further wherein the source of electrical energy is connected to the phase winding via a switch operable to conduct from the positive terminal of the source of electrical energy to the phase winding.

29. A converter circuit for a switched reluctance motor, the motor having at least one energizable phase winding, the circuit comprising:
    a first source of electrical energy for supplying energy to the at least one phase winding at a first voltage;
    a first switch operable to connect the first source to the at least one phase winding;
    a second source of electrical energy for supplying energy at a second voltage; and
    a second switch operable to connect the second source to the at least one phase winding;
    wherein the first source of electrical energy is connectable in parallel with the at least one phase winding; further wherein the second source of electrical energy is connectable in parallel with the at least one phase winding.

30. A circuit as claimed in claim 29 in which the second source has positive and negative terminals and the second switch comprises a thyristor operable to conduct from the positive terminal of the source of electrical energy to the at least one phase winding.

31. A circuit as claimed in claim 30 further comprising a further switch operable to conduct from the at least one phase winding to the negative terminal of the source of electrical energy.

32. A circuit as claimed in claim 31 in which the further switch is a thyristor.

33. A converter circuit for a switched reluctance machine having at least one energizable phase winding, the circuit comprising:
    a first source of electrical energy for supplying energy to the at least one phase winding at a first voltage;
    first means for connecting the first source to the at least one phase winding;
    a second source of electrical energy for supplying energy at a second voltage; and
    second means for connecting the second source to the at least one phase winding;
    wherein the second source has positive and negative terminals and the second means for connecting comprises a thyristor operable to conduct from the positive terminal of the source of electrical energy to the at least one phase winding.

34. A converter circuit for a switched reluctance machine having at least one energizable phase winding, the circuit comprising:
    a first source of electrical energy for supplying energy to the at least one phase winding at a first voltage;
    first means for connecting the first source to the at least one phase winding;
    a second source of electrical energy for supplying energy at a second voltage; and
    second means for connecting the second source to the at least one phase winding;
    wherein the second source of electrical energy comprises an electrical storage device.

35. A converter circuit for a switched reluctance machine having at least one energizable phase winding, the circuit comprising:
- a first source of electrical energy for supplying energy to the at least one phase winding at a first voltage;
- first means for connecting the first source to the at least one phase winding;
- a second source of electrical energy for supplying energy at a second voltage; and
- second means for connecting the second source to the at least one phase winding;
- wherein the first source includes a capacitor for maintaining its voltage.

36. A converter circuit for a switched reluctance machine having at least one energizable phase winding, the circuit comprising:
- a first source of electrical energy for supplying energy to the at least one phase winding at a first voltage;
- first means for connecting the first source to the at least one phase winding;
- a second source of electrical energy for supplying energy at a second voltage;
- second means for connecting the second source to the at least one phase winding; and
- a converter having an input arranged to receive the second voltage and an output connected to the first source, the converter being operable to convert from the second voltage to the first voltage.

37. A converter circuit for a switched reluctance machine having at least one energizable phase winding, the circuit comprising:
- a first source of electrical energy for supplying energy to the at least one phase winding at a first voltage;
- first means for connecting the first source to the at least one phase winding;
- a second source of electrical energy for supplying energy at a second voltage; and
- second means for connecting the second source to the at least one phase winding;
- wherein the second voltage is lower than the first voltage.

38. A switched reluctance drive comprising a reluctance machine having a stator, at least one phase winding, and a converter circuit, the converter circuit comprising:
- a first source of electrical energy for supplying energy to the at least one phase winding at a first voltage;
- first means for connecting the first source to the at least one phase winding;
- a second source of electrical energy for supplying energy at a second voltage; and
- second means for connecting the second source to the at least one phase winding.

39. A converter circuit for a switched reluctance machine having at least one energizable phase winding, the circuit comprising:
- a first source of electrical energy for supplying energy to the at least one phase winding at a first voltage;
- a first switch operable to connect the first source to the at least one phase winding;
- a second source of electrical energy for supplying energy at a second voltage; and
- a second switch operable to connect the second source to the at least one phase winding;
- wherein the second source has positive and negative terminals and the second switch comprises a thyristor operable to conduct from the positive terminals of the source of electrical energy to the at least one phase winding.

* * * * *